United States Patent [19]
Ikegaya et al.

[11] Patent Number: 5,163,018
[45] Date of Patent: Nov. 10, 1992

[54] DIGITAL SIGNAL PROCESSING CIRCUIT FOR CARRYING OUT A CONVOLUTION COMPUTATION USING CIRCULATING COEFFICIENTS

[75] Inventors: Yuji Ikegaya; Shinichi Muramatsu; Yusuke Konagai, all of Hamamatsu, Japan

[73] Assignee: Yamaha Corporation, Hamamatsu, Japan

[21] Appl. No.: 644,250

[22] Filed: Jan. 22, 1991

[30] Foreign Application Priority Data

Jan. 23, 1990 [JP] Japan .................................. 2-13387

[51] Int. Cl.$^5$ .......................................... G06F 15/336
[52] U.S. Cl. ................................................ 364/728.02
[58] Field of Search ...................... 364/728.01, 728.02

[56] References Cited
U.S. PATENT DOCUMENTS

| | | | |
|---|---|---|---|
| 4,489,393 | 12/1984 | Kawahara et al. | 364/728.01 |
| 4,679,164 | 7/1987 | Rearick | 364/728.01 |
| 5,005,149 | 4/1991 | Elleaume et al. | 364/728.01 |

*Primary Examiner*—Long T. Nguyen
*Attorney, Agent, or Firm*—Spensley Horn Jubas & Lubitz

[57] ABSTRACT

A digital signal processing circuit has a coefficient storing portion, a computing portion, a coefficient selection control portion and a coefficient transfer portion. The coefficient storing portion stores multiplier coefficients used for a convolution computation, in which a value of each multiplier coefficient can be arbitrarily changed. The computing portion stores a series of input data to be inputted thereto sequentially during certain period to be previously passed, so that the computing portion carries out the convolution computation on the series of input data by use of the multiplier coefficients. In addition, the coefficient selection control portion controls a selection of a data input/output manner, i.e., either a data first-in-first-out manner or a data circulation manner is selected. The coefficient transfer portion inputs the multiplier coefficients to the storing portion from a external device, or outputs the coefficients to the external device. The convolution computation is carried out on the series of input data by use of the multiplier coefficients, which are supplied from the coefficient storing portion or the coefficient transfer portion. Thus, various digital signal processings can be performed so that the large-scale convolution computation can be carried out on the series of input data by use of the multiplier coefficients which can be easily set.

9 Claims, 6 Drawing Sheets

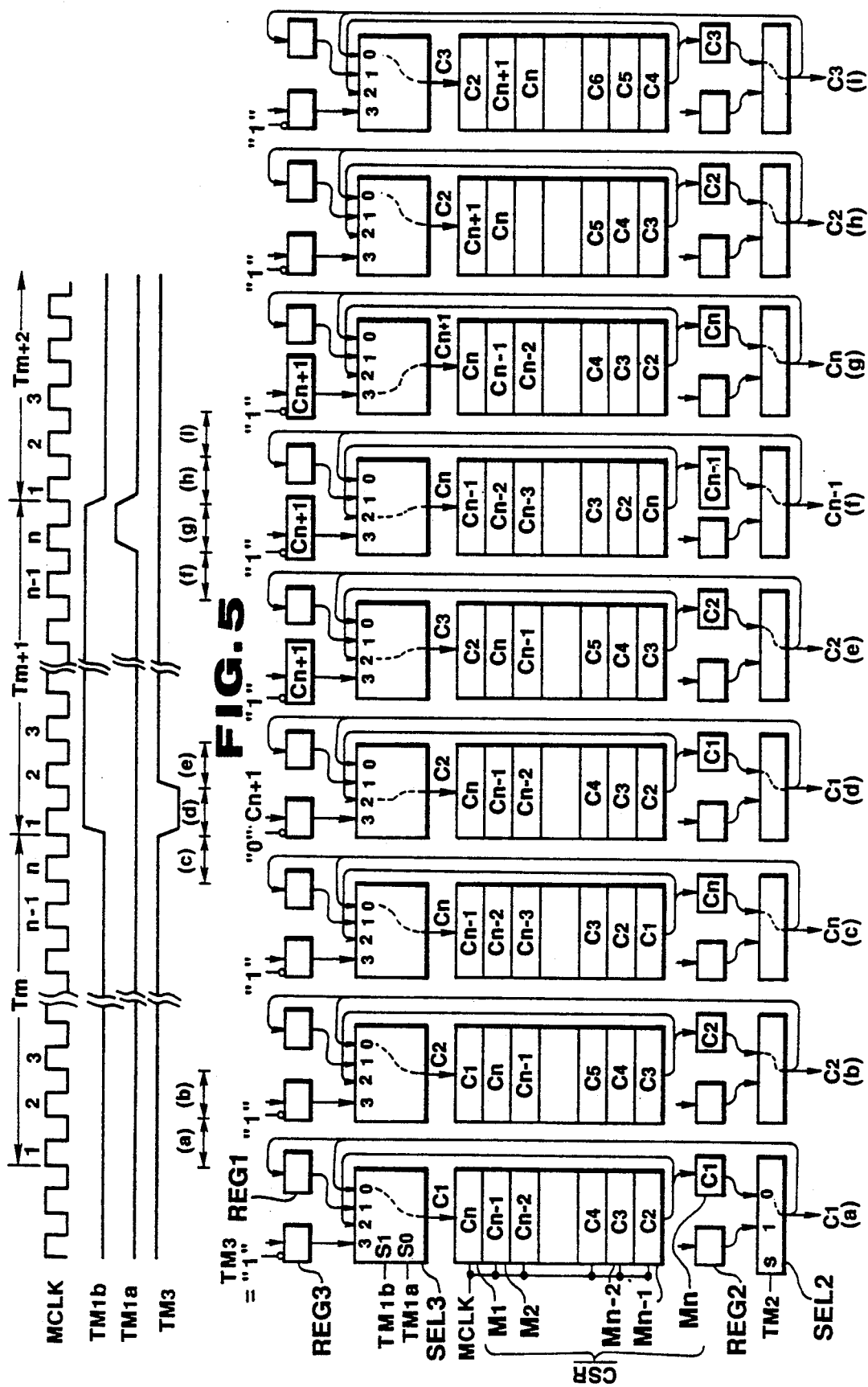

DIGITAL SIGNAL PROCESSING CIRCUIT FOR CARRYING OUT A CONVOLUTION COMPUTATION USING CIRCULATING COEFFICIENTS

BACKGROUND OF THE INVENTION

1. Field of the Invention

The present invention relates to a digital signal processing circuit which is used in the field of the digital audio apparatus and the like.

2. Prior Art

Conventionally, there is a well-known DSP (Digital Signal Processing Circuit), which stores the digital signal to be transmitted in one word by every predetermined period, and then carries out the convolution computation on the digital signal to be stored during the predetermined time. This type of DSP is used for various signal processings such as filtering process, reverberation imparting process and the like. In many of the DSPs which carry out the fixed digital signal processing or small-scale convolution computation, by storing coefficients used for the convolution computation in ROM in advance, the stored coefficients are sequentially read out from ROM and convolution computation is carried out based on the rear coefficients.

In the DSP for use in the audio field which imparts the reverberation effect to the musical tone, the coefficients used for the convolution computation must be changed in response to the condition of acoustical space. Similarly, a plenty of other applications of DSP require the change of the coefficients for use in the convolution computation. As the DSP which satisfies such requirement, there is a DSP which provides RAM as means for storing the coefficients used for the convolution computation. According to this type of DSP, by changing coefficients stored in RAM, various signal processing can be performed. In this case, however, there is a problem in that the writing address is required to be designated by each coefficient, thus, the operation for setting the coefficients is troublesome. Additionally, in order to implement the large-scale convolution computation, the DSP can be embodied by use of plural LSIs. In this case, a series of the coefficients used for the convolution computation must be allocated into corresponding LSIs. However, it requires the external control circuit to be provided for the DSP in order to control the operation for writing the coefficients by each of the allocated coefficients.

SUMMARY OF THE INVENTION

It is accordingly a primary object of the present invention is to provide a digital signal processing circuit in which coefficients used for convolution computation can be set with easy writing operation.

Another object of the present invention is to provide a digital signal processing circuit which can carry out various digital signal processings and the large-scale convolution computation with easy operation for changing coefficients.

In one implementation of the present invention, a digital signal processing circuit for carrying out a convolution computation on a series of input data by use of a multiplier coefficient, comprising:

(a) storing means for storing said multiplier coefficient, in which a value of each multiplier coefficient can be arbitrarily changed;

(b) input/output control means for controlling a selection of a data input/output manner so that said multiplier coefficient is inputted to or outputted from said storing means by either a data first-in-first-out manner or a data circulation manner;

(c) computing means for carrying out said convolution computation on said series of input data by use of said multiplier coefficient to be sequentially outputted from said storing means when said data circulation manner is selected; and (d) coefficient transfer means for carrying out an transfer process on said multiplier coefficient, said coefficient transfer means being activated so that said multiplier coefficient is transferred between said storing means and an external device when said data first-in-first-out manner is selected.

The preferrred embodiments of the present invention are described in a following section with reference to the drawings, from which further objects and advantages of the present invention will become apparent.

BRIEF DESCRIPTION OF THE DRAWINGS

FIG. 5 is a time chart showing the operation of the second embodiment of the present invention;

FIG. 6 (a) to (i) are conceptual diagrams showing a diagrammatical configurations of registers etc. shown in FIG. 4;

DETAILED DESCRIPTION OF THE PREFERRED EMBODIMENTS

[A] CONFIGURATION OF FIRST EMBODIMENT

In the following section, a first preferred embodiment of the present invention will be described with reference to FIGS. 1 through 3.

Figure 1:
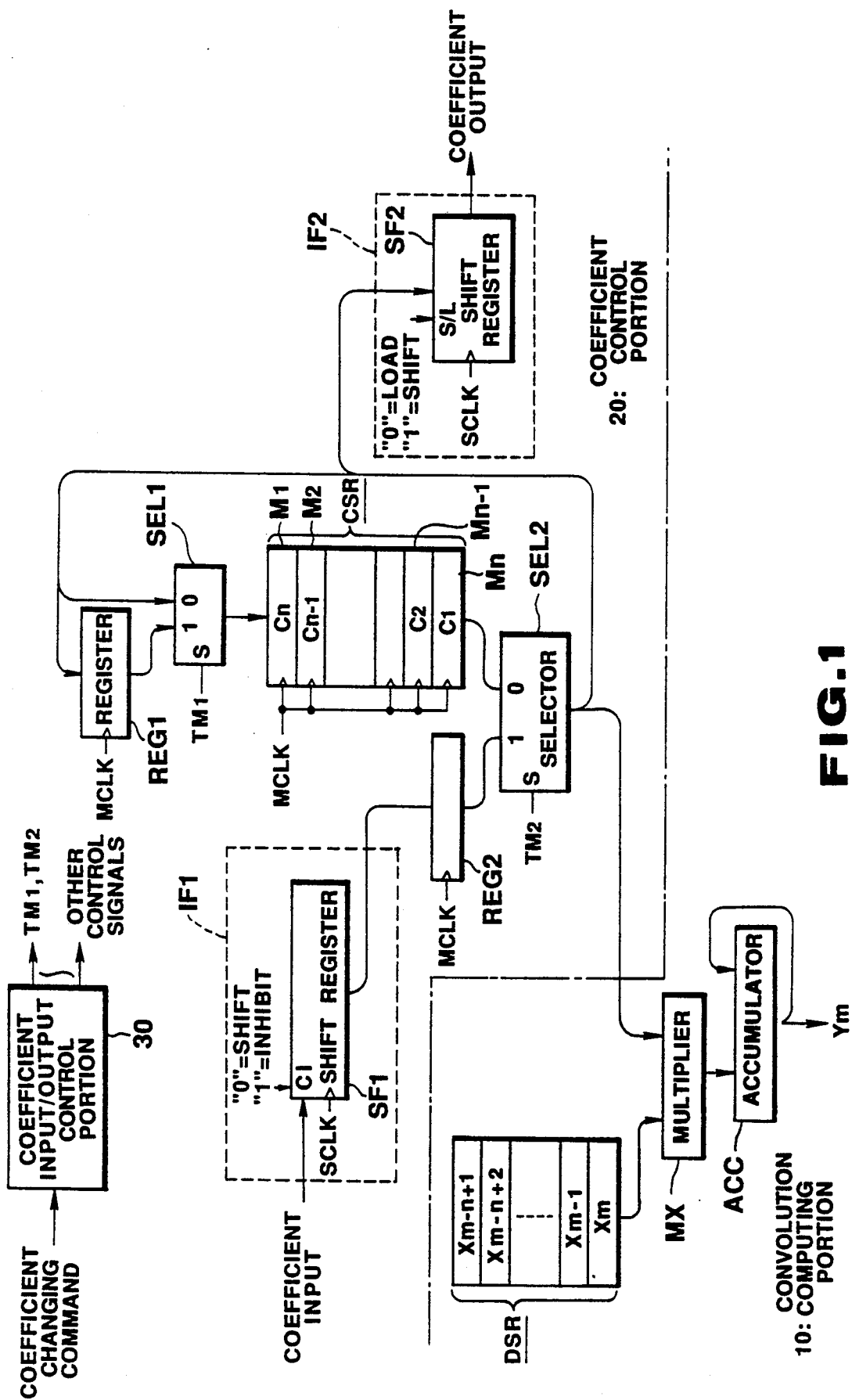
FIG. 1 is a block diagram showing the configuration of a digital signal processing circuit according to an first embodiment of the present invention.

FIG. 1 is a block diagram showing the configuration of a digital signal processing circuit (hereinafter referred to as "DSP") according to an first embodiment of the present invention. The DSP shown in this drawing is suitable for carrying out the convolution computation on the plural input digital signals (the number of which is n, where n is an integral number) to be inputted thereto sequentially in time lapse. In this block diagram, three portions of the DSP are shown, that is, a convolution computing portion 10 which carries out the convolution computation on the n input digital signals by use of multiplier coefficients; a coefficient control portion 20 which stores multiplier coefficients used for convolution computation and supplies them to the convolution computing portion 10; and a coefficient input/output control portion 30 which controls an input/output process on the multiplier coefficients.

First, description will be given with respect to the convolution computing portion 10. The convolution computing portion 10 comprises a data shift register DSR, a multiplier MX, and an accumulator ACC. The data shift register DSR comprises n memory areas and stores a series of input digital signals to be inputted from an external device, for example another DSP, to plural memory areas. This DSP of the first embodiment inputs the input digital signal of one word therein by every predetermined sampling period, wherein thus inputted signals are then sequentially supplied to a data shift register DSR having a plurality of stages (a number n), after which the information previously written into the data shift register DSR is shifted to the next stage within the plural stages. In FIG. 1, the state in which n digital signals $X_m$ to $X_{m-n+1}$ (i.e., digital signal string) are stored into plural stages in the data shift register DSR within the certain sampling period, is shown. Within the certain sampling period, each of the n digital signals $X_m$ to $X_{m-n+1}$ stored in the data shift regiser DSR and each of the multiplier coefficents to be sequentially supplied from the coefficient control portion 20 are multiplied together by the multiplier MX in sequence, each result of which is accumulated by the accumulator ACC. In this way, the convolution computation is carried out on the digital signal string $X_m$ to $X_{m-n+1}$ by employing the time sharing system, the result of computation $Y_m$ is outputted. Thereafter, when the convolution computation in the current sampling period is completed, the accumulator ACC is clear to prepare for another convolution computation in the next sampling period. Additionally, the DSP is designed such that the data stored in the last memory area within n memory areas (hereinafter, simply referred to as last stage) of the data shift register DSR (which correspond to $X_{m-n+1}$ as shown in FIG. 1) and the result $Y_m$ of convolution computation are outputted to an external device by use of an outputting means (not shown in the drawing). In addition, the DSP is designed such that the result $Y_m$ of the convolution computation is added to the input information inputted from an external device by use of adder (similarly not shown), and the result of summation thus obtained in the above-mentioned adder is then outputted therefrom. Herein, description will be given with respect to the relationship among three DSPs (not limited) coupled to one another, wherein there are provided a former-stage DSP, present-state DSP (simply referred to as the DSP) and latter-stage DSP. Accordingly, the memory information stored in the last stage of the data shift register DSR n the present-stage DSP is inputted to the first stage of the data shift register DSR in the latter-stage DSP, and further, the result of convolution computation in the present-stage DSP is inputted to the latter-stage DSP and added to the result of convolution computation in the latter-stage DSP, so that each DSP is connected together so as to form a cascade connection, as a result, the high-order convolution computing circuit can be constructed by the cascade connection manner.

Next, description will be given with respect to the coefficient control portion 20. The coefficient control portion 20 comprises a coefficient shift register CSR, selectors SEL1, SEL2, registers REG1, REG2 and interface circuits IF1, IF2. The coefficient shift register CSR is constructed by plural (a number n) registers $M_1$ to $M_n$ being connected to one another in the form of a cascade connection (i.e., cascade connection manner), wherein multiplier coefficients to be supplied to the convolution computing portion 10 are stored in each of the registers $M_1$ to $M_n$. In FIG. 1, the state in which each of the multiplier coefficients $C_1$ to $C_n$ used for convolution computations is stored in each of the registers $M_n$ to $M_1$, respectively, is shown. In this coefficient shift register CRS, a master clock pulse MCLK is supplied at fixed intervals to each of the registers $M_1$ to $M_n$ as a shift clock pulse. In addition, the multiplication processing of the multiplier MX in the convolution computing portion 10 described above is also carried out in synchronization with this master clock pulse MCLK.

To the register $M_1$ positioned in the first stage of the coefficient shift register CSR (hereinafter, simply referred to as first stage register $M_1$), the output of selector SEL1 is supplied. Additionally, the output of the register $M_n$ positioned in the last stage of the coefficient shift register CSR (hereinafter, simply referred to as last stage register $M_n$) is supplied to the input terminal indicated by [0] of the selector SEL2. To each of the select terminals indicated by [s] of these selectors SEL1 and SEL2, each of the control signals $TM_1$ and $TM_2$ is supplied as select information used for selecting one of input data, respectively. These control signals $TM_1$ and $TM_2$ are changed to "1" or "0" (corresponding to the signal level) by the coefficient input/output control portion 30 when a command indicating the change of a coefficient (hereinafter, simply referred to as a coefficient change command) is issued to the DSP from an external device.

To the register REG2, a coefficient data (i.e., a multiplier coefficient) is inputted from the external device via the interface circuit IF1 which will be described later. The coefficient data thus inputted is written into the register REG2 in synchronization with the master clock pulse MCLK. In the selector SEL2, the output of last stage register $M_n$ is selected when the control signal $TM_2$ is "0", on the other hand, the output of register REG2 is selected when the control signal $TM_2$ is "1", after which the result of selection is outputted to the following circuits. More specifically, the output of selector SEL2 is supplied to 4 circuits, that is, to the multiplier MX of convolution computing portion 10, to the register REG1, to the input terminal indicated by [0] of the selector SEL1 and to the external DSP via the interface circuit IF2 which will be described later. In the register REG1, the output signal thus outputted from the selector SEL2 is written therein in synchronization with the master clock pulse MCLK. In the selector SEL1, when the control signal $TM_1$ is "0", the output signal supplied from the selector SEL2 is selected, on the other hand, when the control signal $TM_1$ is "1", the output signal supplied from the register REG1 is selected, and the result of selection is outputted to the first stage register $M_1$ in the coefficient shift register CSR.

Herein, description will be given with respect to data transmission manner of the first embodiment.

First, in the DSP of the first embodiment, the data transmission is executed in the form of an unit word (i.e., one word) in parallel. On the other hand, the digital signal to be carried out the convolution computation or the multiplier coefficient used for convolution computation, etc., are supplied from external device in the form of one bit in serial. In addition, in the case where data stored in the data shift register DSR, a result of convolution computation or a coefficient used for convolution computaton, etc., are outputted to an external device, each of the data is also outputted in the form of one bit in serial. Therefore, the transfer of data between an external device and the DSP is executed via the interface circuit IF1 or IF2 in the form of one bit in serial. More specifically, to the interface circuit IF1, a coefficient data used as newly multiplier coefficient for the convolution computation is supplied from the external device in the form of one bit in serial. The serial data thus supplied is stored by one word in the shift register SF1 and outputted to the register REG2 as parallel data. Similarly, in the interface circuit IF2, the shift register SF2 is provided for outputting the parallel data as the serial data by one bit.

To the shift register SF1, a shift clock pulse SCLK synchronized with the master clock pulse MCLK is supplied. Additionally, the level at clock inhibit terminal CI of the shift register SF1 is changed to "0" or "1" by the coefficient input/output control portion 30. Herein, in the case of "0", the shift operation in the shift register SF1 is permitted, while in the case of "1", the shift operation is inhibited.

In the same way, the shift clock pulse SCLK is supplied to the shift register SF2 as well as the shift register SF1. Futhermore, the level at shift control terminal S/L of the shift register SF2 is changed to "0" or "1" by the coefficient input/output control portion 30, wherein in the case of "0", the output of selector SEL2 is written into the shift register SF2 in parallel in synchronization with the shift clock pulse SCLK (corresponding to the loading operation as shown in the drawing), while in the case of "1", the data stored in the shift register SF2 is picked out to an external device by one bit in synchronization with the shift clock pulse SCLK (corresponding to the shifting operation as shown in the drawing).

[B] Operation of the First Embodiment

In the following section, the operation of the above described first embodiment of the present invention will be explained.

Figure 2:
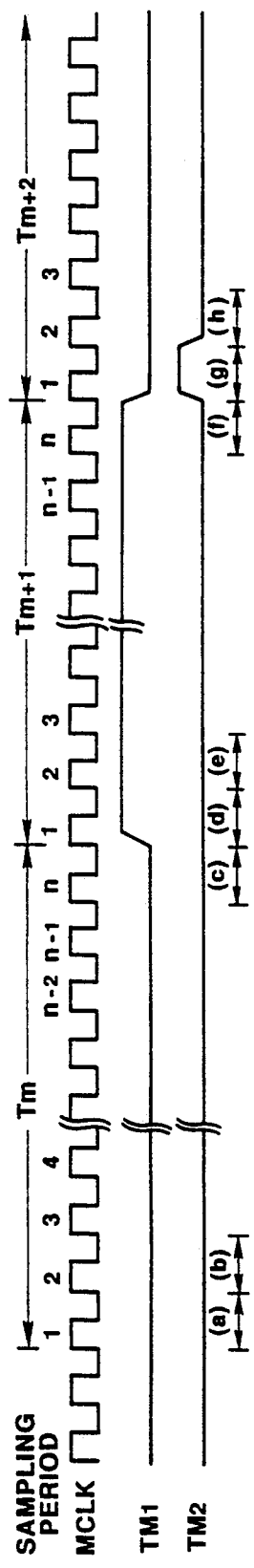
FIG. 2 is a time chart showing the operation of the first embodiment of the present invention.

FIG. 2 shows a time chart illustrating the operation of the DSP. In addition, FIG. 3 (a) to (h) are conceptual diagrams showing diagrammatical configurations of registers, etc., in the coefficient control portion 20 shown in FIG. 1.

Normal Operation of Convolution Computing

In the case where normal operation of the convolution computation is carried out, the control signals $TM_1$ and $TM_2$ are held to "0" by the coefficient control portion 30. As a result, the output of last stage register $M_n$ is selected by the selector SEL2 and supplied to the selector SEL1. In the selector SEL1, the selecting result of the selector SEL2 supplied therefrom is then selected, and the selecting result of which is supplied to the first stage register $M_1$ in the coefficient shift register CSR. Accordingly, the coefficient shift register CSR, selectors SEL1 and SEL2 as a whole operate in the form of the so-called circulatory shift register, wherein a multiplier coefficient can be repeatedly circulated through these components.

Figure 3:
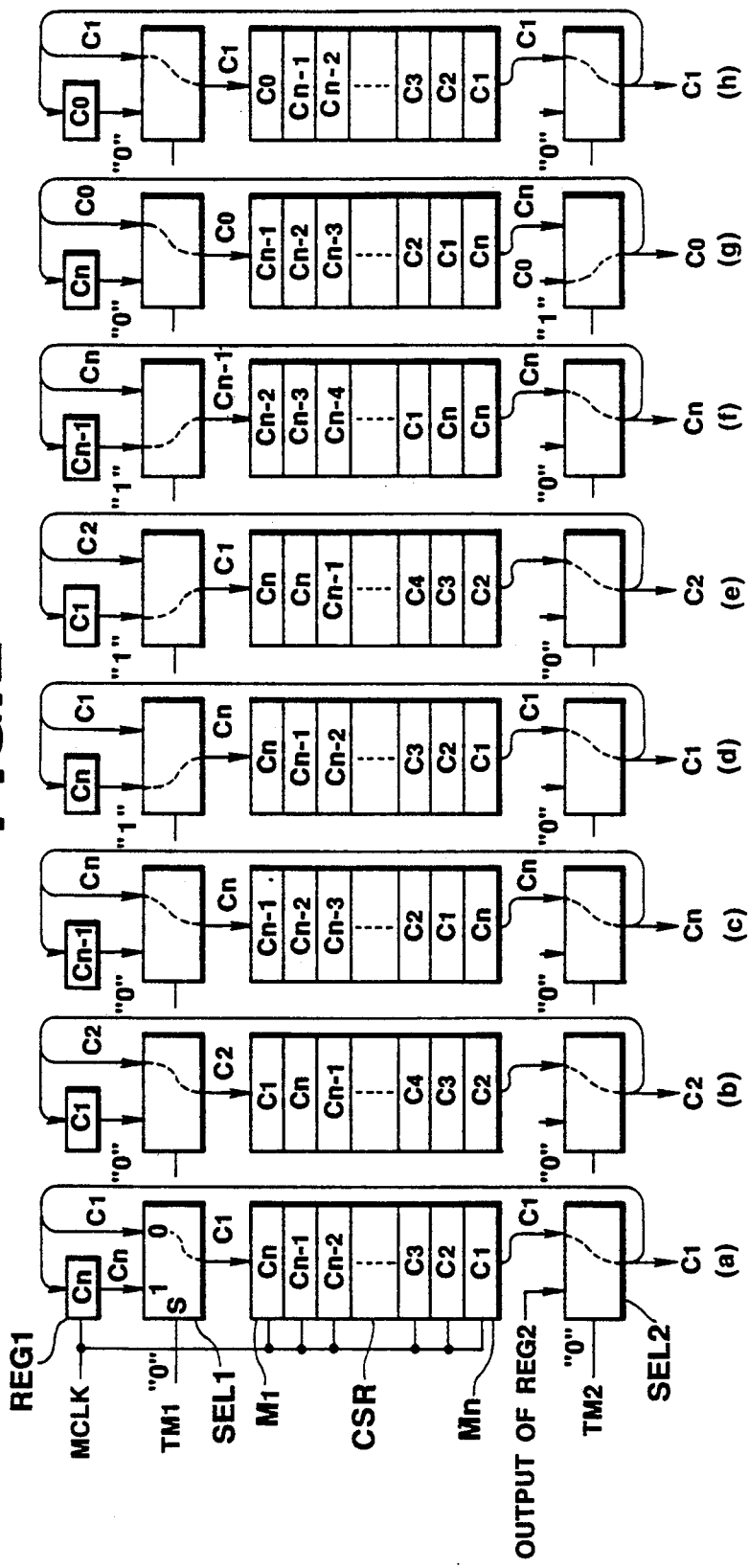
FIG. 3 (a) to (h) are conceptual diagrams showing a diagrammatical configurations of registers etc. shown in FIG. 1.

In the time chart shown in FIG. 2, assuming that the sampling period is changed to $T_m$, the first master clock pulse MCLK rises up, thereby multiplier coefficients $C_1$ to $C_n$ are stored into each of stages in the coefficient shift register CSR, respectively (see FIG. 2 (a) and FIG. 3 (a)). In this case, these multiplier coefficients $C_1$ to $C_n$ are sequentially shifted to each of the stages in the coefficient shift register CSR in synchronization with the master clock pulse MCLK, and the result of shift operation (i.e., the output of the register $M_n$) is supplied to the convolution computing portion 10 in the order of $C_1, C_2, \ldots$ via the selector SEL2, and to the first stage register $M_1$ of coefficient shift register CSR via the selector SEL1. When the sampling period $T_m$ is finished and changed to new sampling period $T_{m-1}$, n master clock pulses MCLK are supplied to the coefficient shift register CSR. Thus, the multiplier coefficients $C_1$ to $C_n$ are stored into each of the stages in the coefficient shift register CSR again, respectively (see FIG. 2 (d) and FIG. 3 (d)).

On the other hand, in the convolution computing portion 10, the digital signal to be inputted to the multiplier MX from the data shift register DSR is changed to $X_m, X_{m-1}, \ldots, X_{m-n+1}$ within the one sampling period as described above. At this time, in synchronization with above changing operation, the multiplier coefficients $C_1, C_2, \ldots, C_n$ are supplied to the multiplier MX from the selector SEL1. Accordingly, the result $Y_m$ of the convolution computation shown in the following Equ. (1) is obtained in the accumulator ACC at the end of the current sampling period.

$$Y_m = \sum_{k=1}^{n} C_k \cdot X_{m-k+1} \qquad \text{Equ (1)}$$

When the sampling period $T_m$ is finished and changed to new sampling period $T_{m+1}$, new digital signal $Y_{m+1}$ is supplied to the data shift register DSR, wherein the convolution computation is carried out on the digital signal string $X_{m+1}$ to $X_{m-n+2}$ by use of the multiplier coefficients $C_l$ to $C_n$ stored into each stage of the coefficient shift register CSR.

Operation of DSP for Writing the Coefficient

In the case where a new multiplier coefficient given from an external device is written into the coefficient shift register CSR, the coefficient change command is issued to the coefficient input/output control portion 30. Thus, the level of clock inhibit terminal CI in shift register SF1 is changed to "0" at timing which is in synchronization with the sampling period. Accordingly, a multiplier coefficient $C_0$ supplied from an external device, for example, from an external device (DSP) or from the former-stage DSP, is sequentially written into the shift register SF1 by one bit in synchronization with the shift clock pulse SCLK. Thereafter, when inputting the multiplier coefficient of one word complete, the level of clock inhibit termial CI in shift register SF1 is changed to "1", therefore, the shifting operation is stopped.

In addition, by issuing the coefficient change command to the coefficient input/output control portion 30, the control signal $TM_1$ is changed to "1" at timing which is in synchronization with the sampling period, and held to "1" over one sampling period (see period $T_{m+1}$ shown in FIG. 2). Thus, the output of register REG1 is selected by the selector SEL1 and supplied to the coefficient shift register CSR. In this sampling period $T_{m+1}$, the multiplier coefficients $C_1$ to $C_n$ are circulated through the circulatory shift register having n+1 stages which is made up of the coefficient shift register CSR and the register REG1, in parallel with the above-mentioned inputting operation in which the multiplier coefficient $C_0$ is inputted to the shift register SF1. Thus, the multiplier coefficients are outputted to the corresponding component (i.e., the multiplier MX etc.) from the selector SEL2 in the order of $C_1$, $C_2$, ... (see FIG. 2 (d) to (f) and FIG. 3 (d) to (f)). As time passes and reaches time (f) in FIG. 2, each of the storing contents in the registers $M_n$ to $M_1$ are changed to $C_n$, $C_n$, $C_1$, ..., $C_{n-1}$, respectively, and accordingly, the stored content in the last stage register $M_n$, that is, the multiplier coefficient $C_n$ is outputted to the selector SEL2 and selected therein. The multiplier coefficient $C_n$ selected in the selector SEL2 is then outputted therefrom to the shift register SF2 in the interface circuit IF2. At the same time, the shift control terminal S/L of shift register SF2 is "0", so that the multiplier coefficient $C_n$ outputted from the selector SEL2 is written into the shift register SF2 in parallel in synchronization with the shift clock pulse SCLK.

When the sampling period $T_{m+2}$ is finished and changed to newly sampling period $T_{m+2}$, the control signal $TM_1$ is changed to "0", while the control signal $TM_2$ is changed to "1". At this time, due to the fact that the first master clock pulse MCLK in the sampling period $T_{m+2}$ rises up, each of the storing contents in the registers $M_n$ to $M_1$ is changed to $C_n$, $C_1$, ... $C_{n-1}$ (see FIG. 3 (g)), respectively. In addition, the multiplier coefficient $C_0$ has been written into the register REG2 until the sampling period $T_{m+1}$ is over. Since the control signal $TM_2$ is "1", the selector SEL2 selects the output of register REG2. Thus, the output $C_n$ of register $M_n$ is neglected, and newly multiplier coefficient $C_0$ stored in the register REG2 is selected by the selector SEL2. Then, the multiplier coefficient $C_0$ selected by the selector SEL2 is supplied to the convolution computing portion 10 and to the register $M_1$ via the selector SEL1.

When the second master clock pulse MCLK in the sampling period $T_{m+2}$ rises up, the control signal $TM_2$ is changed to "0", and accordingly, the selector SEL2 selects the output of register $M_n$ in the coefficient shift register CSR. On the other hand, at this time, the multiplier coefficient $C_0$ outputted from the selector SEL1 is inputted into the first stage register $M_1$, and accordingly, each of the storing contents in the registers $M_n$ to $M_1$ become to $C_1$, $C_2$, ..., $C_{n-1}$, $C_0$, respectively. In other words, coefficient string in the registers $M_n$ to $M_1$ includes newly multiplier coefficient $C_0$ to the first stage register $M_1$. Then, the multiplier coefficient $C_1$ from the last stage register $M_n$ is supplied to the convolution computing portion 10 through the activated selector SEL2. Thereafter, the multiplier coefficient string is shifted in data circulation manner through the coefficient shift register CSR and the selectors SEL2, SEL1 (which are constructed the so-called circulatory shift register), and as a result, the multiplier coefficients $C_2$, ..., $C_{n-1}$ are sequentially supplied to the convolution computing portion 10 through the activated selector SEL2.

Additionally, in the sampling period $T_{m+2}$, when the shift control terminal S/L of shift register SF2 is changed to "1", the shift register SF2 is in the shifting operation described above, so that the multiplier coefficient $C_n$ is outputted therefrom to an external device by one bit in synchronization with the shift clock pulse SCLK. In the case where an external DSP as a latter-stage DSP is connected with the present-stage DSP, in the latter-stage DSP, the multiplier coefficient $C_n$ is inputted therein by use of an interface circuit similar to the interface circuit IF1 shown in FIG. 1, wherein the multiplier coefficient string is sequentially shifted in data circulation manner by the same way described above. Thus, the multiplier coefficient is changed, that is, changing of the storing contents in the coefficient shift register CSR is operated.

Thereafter, when the sampling period $T_{m+2}$ is finished and changed to new sampling period, for example $T_{m+3}$, in the present-stage DSP, each of the stored contents corresponding to each of the stages in the coefficient shift register CSR becomes $C_0$, $C_1$, ..., $C_{n-1}$, respectively, after which in the same way as sampling period $T_{m+2}$ the multiplier coefficients are supplied to the convolution computing portion 10 in the order of $C_0$, $C_1$, ..., $C_{n-1}$, and are circulated through the circulatory shift register in the data circulation manner.

In this way, by issuing the coefficient changing command to the present-stage DSP and inputting the multiplier coefficient to be newly written into the present-stage DSP, the new multiplier coefficient is supplemented as the head multiplier coefficient in the multiplier coefficient string stored previously, and at this time, the bottom multiplier coefficient in the multiplier coefficient string stored previously is deleted. Herein, the head multiplier coefficient is defined as the multiplier coefficient which is initially supplied to the multiplier MX after the changing operation of the sampling period. On the other hand, the bottom multiplier coefficient is defined as the multiplier coefficient which is supplied to the multiplier MX at last timing of the sampling period. Additionally, the multiplier coefficient thus deleted by inputting operation of the new one is outputted therefrom to an external device via the interface circuit IF2. Accordingly, in the case where a plurality of the DSP are connected with each other in the cascade connnection manner, when a new multiplier coefficient is written into the first-stage DSP, the multiplier coefficient to be deleted by the above-mentioned inputting operation can be shifted to the second-stage DSP. As a result, by repeatedly carrying out the inputting operation described above, a series of multiplier coefficients can be written into all of the DSPs connected together in the cascade connection manner. In other words, the multiplier coefficient used for convolution computation can be shifted between adjacent two DSPs in the cascade connection manner. Therefore, various digital signal processing can be carried out on a large-scale convolution computation with easy operation for changing the coefficients.

SECOND EMBODIMENT

Figure 4:
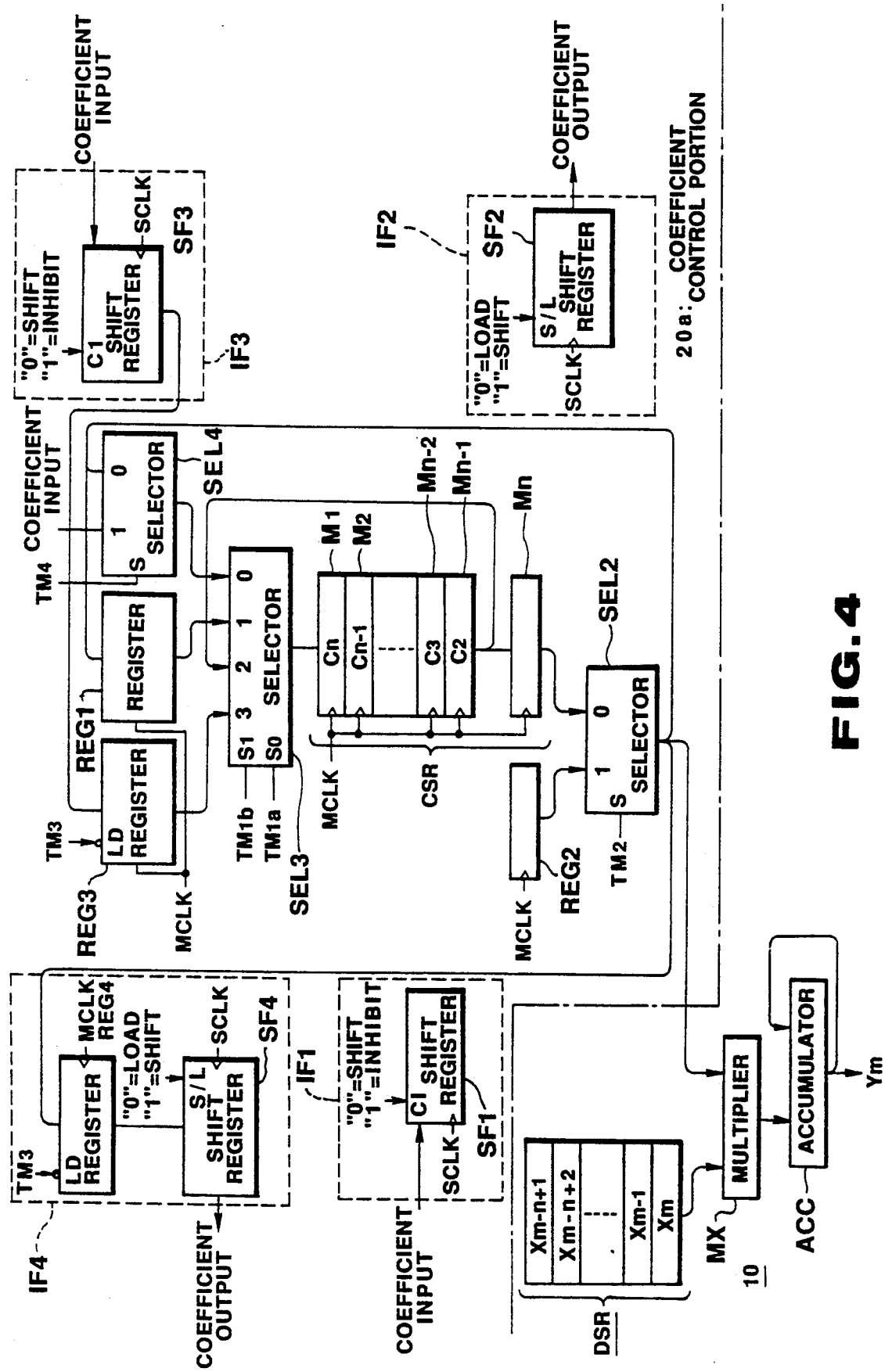
FIG. 4 is a block diagram showing the configuration of a digital signal processing circuit according to a second embodiment of the present invention.

Next, description will be given with respect to the second embodiment of the present invention by referring to FIG. 4 through FIG. 6. FIG. 4 is a block diagram showing the configuration of a DSP according to a second embodiment of the present invention. In FIG. 4, parts identical to those shown in FIG. 1 will be designated by the same numerals, hence, description thereof will be omitted.

The DSP according to the second embodiment as shown in FIG. 4 is designed to construct such that the high-order convolution computing circuit is implemented in the cascade connection manner similar to the first embodiment described above. Additionally, in the case where the convolution computing circuit is implemented by connecting with such DSPs together in the cascade connection manner, the DSP according to the second embodiment is designed to shift the multiplier coefficients used for convolution computation in direction of positive such as the first-stage DSP→the second-stage DSP→the thrid stage-DSP→ . . . as well as the case of first embodiment, and also in direction of reverse such as the n-th-stage DSP→the (n−1)th-stage DSP→ . . . In addition, the DSP according to the second embodiment is able to replace a current multiplier coefficient with new multiplier coefficient at an arbitrary position of the coefficient string.

Referring to FIG. 4, a coefficient control portion 20a can be seen that, in addition to the construction of the coefficient control portion 20 of the first embodiment, interface circuits IF3 and IF4 are provided therein. The interface circuit IF3, identical to foregoing interface circuit IF1, comprises a shift register SF3 which converts serial data supplied from an external device into parallel data. In addition, the interface circuit IF3 is used for inputting therein a multiplier coefficient to be shifted from the latter-stage DSP. The interface IF4 comprises a register REG4 and a shift register SF4, and supplies a multiplier coefficient to the former-stage DSP. To a load terminal LD of register REG4, a control signal $TM_3$ is supplied from a coefficient input/output control portion (not shown in the drawing), the master clock pulse MCLK is supplied to a clock terminal thereof. To a clock terminal of the shift register SF4, the shift clock pulse SCLK is supplied, and the level at shift control terminal S/L thereof is changed to "0" or "1" by the coefficient input/output control portion (not shown in the drawing), wherein in the case of "0", the loading operation is executed, while in the case of "1", the shifting operation is executed.

In addition, the selector SEL1 shown in FIG. 1 is replaced with a selector SEL3 in the second embodiment. The output of selector SEL3 is supplied to the first-stage register $M_1$ in the coefficient shift register CSR. The selector SEL3 comprises 4 input terminals indicated by [0], [1], [2] and [3], wherein to the input terminal indicated by [0], the output of selector SEL4 is supplied; to the input terminal indicated by [1], the output of register REG1 is supplied; to the input terminal indicated by [2], the output of (n−1)-th-stage register $M_{n-1}$ in the coefficient shift register CSR is supplied; and to the input terminal indicated by [3], the output of register REG3 is supplied. Accordingly, in the second embodiment, the coefficient shift register CSR is characterized in that a data can be picked up from the (n-1)-th-stage register $M_{n-1}$. This point is different from the first embodiment.

To select terminals $S_1$ and $S_0$ of selector SEL3, control information $TM_{1b}$ and $TM_{1a}$ outputted from the coefficient input/output control portion (not shown in the drawing) are supplied as select information, respectively. To a clock terminal of register REG3, the master clock pulse MCLK is supplied, to a load terminal LD thereof, a control signal $TM_3$ is supplied. The level of the control signal $TM_3$ is changed to "0" or "1" by the coefficient input/output control portion (not shown in the drawing), wherein in the case of "0", the register REG3 is activated for loading operation so that a storing content of the shift register SF3 is written into the register REG3 in synchronization with the master clock pulse MCLK. On the other hand, in the case of "1", the register REG3 is not activated. To the selector SEL4, the output of selector SEL2 and coefficient data inputted from an external device are supplied, wherein the selector SEL4 selects one of these data supplied therein in response to a control information $TM_4$ inputted to the select terminal S thereof and outputs the selected result to the selector SEL3.

In the following section, the operation of the above described embodiment of the present invention will be described.

Normal Operation of Convolution Computing

In the case where normal operation of convolution computing is carried out, the control signals $TM_{1a}$, $TM_{1b}$, $TM_2$ and $TM_4$ are set to "0". In response to the level "0" of control signals, all of the selectors SEL2, SEL4 and SEL3 select the input data to be inputted to the terminal indicated by [0]. As a result, the output of last-stage register $M_n$ in the coefficient register CSR is inputted to the first-stage register $M_1$ of coefficient shift register CSR via the selectors SEL2, SEL4 and SEL3. As a result, the multiplier coefficient string stored in the coefficient shift register CSR is circulated through the circulatory shift register which is made up of the shift register CSR and the selectors SEL2, SEL4 and SEL3 every one sampling period as well as the first embodiment, and the output of the last-stage register $M_n$ is supplied to the convolution computation portion 10 through the selector SEL2.

Operation in the Case of Adding New Coefficient at the Head Position of the Coefficient String In this case, the operation identical to the first embodiment is carried out. First, the control signal $TM_{1a}$ is set to "1" over one sampling period, in which in response to this control signal $TM_{1a}$ the selector SEL3 selects the output of the register REG1, so that the output of register REG1 is outputted to the coefficient shift register CSR through the selector SEL3. Accordingly, the multiplier coefficient string $C_1$ to $C_n$ is shifted through the circulatory shift register which has (n+1) stages and is made up of the coefficient shift register CSR and register REG1 in the data circulation manner. Thereafter, when the sampling period is changed to a new one, the control signal $TM_2$ is set to "1" over one period of the master clock pulse MCLK. Therefore, the selector SEL2 selects the input data to be inputted to the terminal indicated by [1], so that the multiplier coefficient $C_0$ written into the register REG2 via the interface circuit IF1 at this time is selected by the selector SEL2. Then, the selected result of the selector SEL2 is supplied to the convolution computation portion 10, and to the first-stage register $M_1$ of the coefficient shift register CSR via the selectors SEL4 and SEL3. Next, the multiplier coefficient $C_0$ thus supplied is written into the coefficient shift register CSR in synchronization with the rising up of the next master clock pulse MCLK. In other words, the operation in the case of adding new coefficient $C_0$ at the head position (corresponding to the first-stage register $M_1$) of the coefficient string can be performed.

Operation in the Case of Adding New Coefficient at the Last Position of the Coefficient String FIG. 5 shows a time chart used for explaining operation of the coefficient control portion 20a in the case of adding new multiplier coefficient at the last position of the coefficient string. FIG. 6 (a) to (i) show the state corresponding to each part of the coefficient control portion 20a in plural period (a) to (i) of time chart in FIG. 5, respectively.

Referring to these drawings, for carrying out the above operation, the control signals $TM_2$ and $TM_4$ are always held to "0". As a result, the selector SEL2 selects the input data to be inputted to the terminal indicated by [0], so that the output of the last-stage register $M_n$ in the coefficient shift register CSR is always selected by the selector SEL2. Similarly, the selector SEL4 selects the input data to be inputted to the terminal indicated by [0], so that the output of selector SEL2 is always selected by the selector SEL4. Accordingly, the selecting result of selector SEL2 is always inputted to the selector SEL3 via the selector SEL4. Incidentally, the selector SEL4 is not shown in FIG. 6 (a) to (i).

In the following section, the operation of the coefficient control portion 20a in the case of adding new coefficient at the last position of the coefficient string will be described in detail referring to FIGS. 5 and 6. When the coefficient change command is issued to the coefficient input/output control portion 30 (not shown in FIG. 4), the level of clock inhibit terminal CI in shift register SF3 is changed to "0" in synchronization with the change timing of sampling period. Accordingly, the shift register SF3 is permitted the shifting operation, so that the multiplier coefficient $C_{n+1}$ supplied from the latter-stage DSP is written into the shift register SF3 by one bit in serial (see at sampling period $T_m$). Thereafter, when inputting the multiplier coefficient for one word complete, the level of clock inhibit terminal CI in shift register SF3 is changed to "1", therefore, the shifting operation is stopped.

Next, when the sampling period is changed to new $T_{m+1}$ and the first master clock pulse MCLK is inputted to the coefficient shift register CSR, each of the storing contents in the registers $M_n$ to $M_1$ becomes to $C_1$ to $C_n$, respectively (see FIG. 6 (d)). At this time, the control signal $TM_{1b}$ is changed to "1", while the control signal $TM_3$ is changed to "0". Additionally, the control signal $TM_3$ is held to "0" over the time corresponding to one period of the master clock pulse MCLK (equal to period (d) shown in FIG. 5), so that the registers REG3 and REG4 are set in the stand-by state for writing a data therein in parallel. Next, when the master clock pulse MCLK rises up, the multiplier coefficient $C_{n+1}$ outputted from the latter-stage DSP and inputted to the shift register SF3 is written into the register REG3 (see FIG. 6(e)). Additionally, the multiplier coefficient $C_1$ which has been outputted from the selector SEL2 in the period shown in FIG. 5 (d) is written into the register REG4. Then, the control signal $TM_3$ is returned to "1", hereinafter even if the master clock pulse MCLK is inputted to the register REG3, the register REG3 holds the multiplier coefficient $C_{n+1}$ written therein, while the register REG4 holds the multiplier coefficient $C_1$ written therein. Furthermore, at this time, the level of shift control terminal S/L in the shift register SF4 is "0". Accordingly, the shift register SF4 is permitted the shifting operation, so that the multiplier coefficient $C_1$ written and held in the register REG4 is written into the shift register SF4 in synchronization with the shift clock pulse SCLK inputted therein later.

On the other hand, the control signal $TM_{1b}$ is held to "1" over the sampling period $T_{m+1}$. In the period (corresponding to the period FIG. 5 (d) through FIG. 5 (f)) in which the first through (n−1)-th master clock puslses MCLK are inputted to the coefficient shift register CSR in the sampling period $T_{m+1}$, the control signal $TM_{1a}$ is held to "0". Thus, in this period FIG. 5 (d) through FIG. 5 (f), the output of (n−1)-th-stage register $M_{n-1}$ in the coefficient shift register CSR is selected by the selector SEL3 and inputted to the first-stage register $M_1$. Herein, the multiplier coefficient $C_1$ outputted from the selector SEL2 in the period FIG. 5 (d) is not inputted to the first-stage register $M_1$ and deleted from the multiplier coefficient string to be stored in the coefficient shift register CSR. Accordingly, in the period (d) FIG. 5 through FIG. 5 (f), the multiplier coefficient string $C_2$ to $C_n$ is shifted through the circulatory shift register which has (n−1) stages and is made up of the register $M_1$ to $M_{n-1}$ and selector SEL3 in the data circulation manner. Additionally, in this period, the output of register $M_{n-1}$ is supplied to the register $M_n$ to be delayed for a predetermined delay interval which corresponds to one period of the master clock pulse MCLK. The result of delaying operation, that is, output of register $M_n$ is then supplied to the convolution computation portion 10 through the selector SEL2. Thereafter, in the period FIG. 5 (f), each storing content of registers $M_{n-1}$ to $M_1$ becomes $C_n, C_2, \ldots, C_{n-1}$, respectively.

Next, when the n-th master clock pulse MCLK rises up, each of the storing contents of registers $M_{n-1}$ to $M_1$ $C_2$ to $C_n$, respectively, by carrying out the shifting operation in the data circulation manner (see FIG. 6 (g)). At this time, the control signal $TM_{1a}$ is changed to "1". As a result, the output of register REG3 is selected by the selector SEL3, and accordingly, the multiplier coefficient $C_{n+1}$ stored in the register REG3 is then supplied to the first-stage register $M_n$ through the selector SEL3. When the sampling period $T_{m+1}$ is finished and changed to new sampling period $T_{m+2}$, the first master clock pulse MCLK rises up and the control signals $TM_{1a}$ and $TM_{1b}$ are both changed to "0". In this time, the multiplier coefficient $C_{n+1}$ is written into the first-stage register $M_1$, as a result, each of the storing contents of the registers $M_n$ to $M_1$ changes to $C_2$ to $C_{n+1}$, respectively (see FIG. 6 (h)). Thereafter, the multiplier coefficient string $C_2$ to $C_{n+1}$ is shifted through the circulatory shift register which has n stages and is made up of the coefficient shift register CSR and selectors SEL4, SEL3, SEL2 in the data circulation manner. Additionally, the multiplier coefficient string $C_2$ to $C_{n+1}$ is also sequentially supplied to the convolution computing portion 10 from the last-stage register $M_n$ through the selector SEL 2 in synchronization with the master clock pulse MCLK. In addition, in this sampling period $T_{m+2}$, the level of shift control terminal S/L in the shift register SF4 is changed to "1" (corresponding to the shifting operation), so that the multiplier coefficient $C_1$ is transferred to the former-stage DSP by one bit in serial. In the former-stage DSP, the operation similar to the above described processes is carried out, thereby adding the new multiplier coefficient $C_1$ at the last position of the coefficient string.

Operation in the Case of Replacing Current Coefficient by new Coefficient at an Arbitrary Position of the Coefficient String In this DSP, a current multiplier coefficient at an arbitrary position can be replaced by new multiplier coefficient given from an external device. In this case, the new multiplier coefficient given from the external device as input information is supplied to the input terminal indicated by [1] of selector SEL4. In addition, in the state where the control signals $TM_{1a}$, $TM_{1b}$, $TM_2$ and $TM_4$ are both held to "0", the coefficient string is circulated in data circulation manner, wherein the control signal $TM_4$ is changed to "1" at timing corresponding to the position at which a current multiplier coefficient is replaced with a new one, so that new multiplier coefficient is written into the first-stage register $M_1$ through the selector SEL4 and SEL3. For example, in the case where the multiplier coefficient $C_2$ among the coefficient string $C_1$ to $C_n$ is replaced with a new multiplier coefficient (i.e., the multiplier coefficient $C_a$) supplied from the external device, as shown in FIG. 6 (b), the control signal $TM_4$ is changed to "1" in the period in which the storing content of last-stage register $M_n$ in the coefficient shift register CSR becomes to $C_2$, such that the new multiplier coefficient $C_a$ is selected by the selector SEL4 instead of the multiplier coefficient $C_2$. By carrying out the above-mentioned processing, the new multiplier coefficient $C_a$ is written into the coefficient shift register CSR as the coefficient which is in the following position of the multiplier coefficient $C_1$. In other word, the current multiplier coefficient $C_2$ at an arbitrary position can be replaced by new multiplier coefficient $C_a$ given from an external device.

THIRD EMBODIMENT

Figure 7:
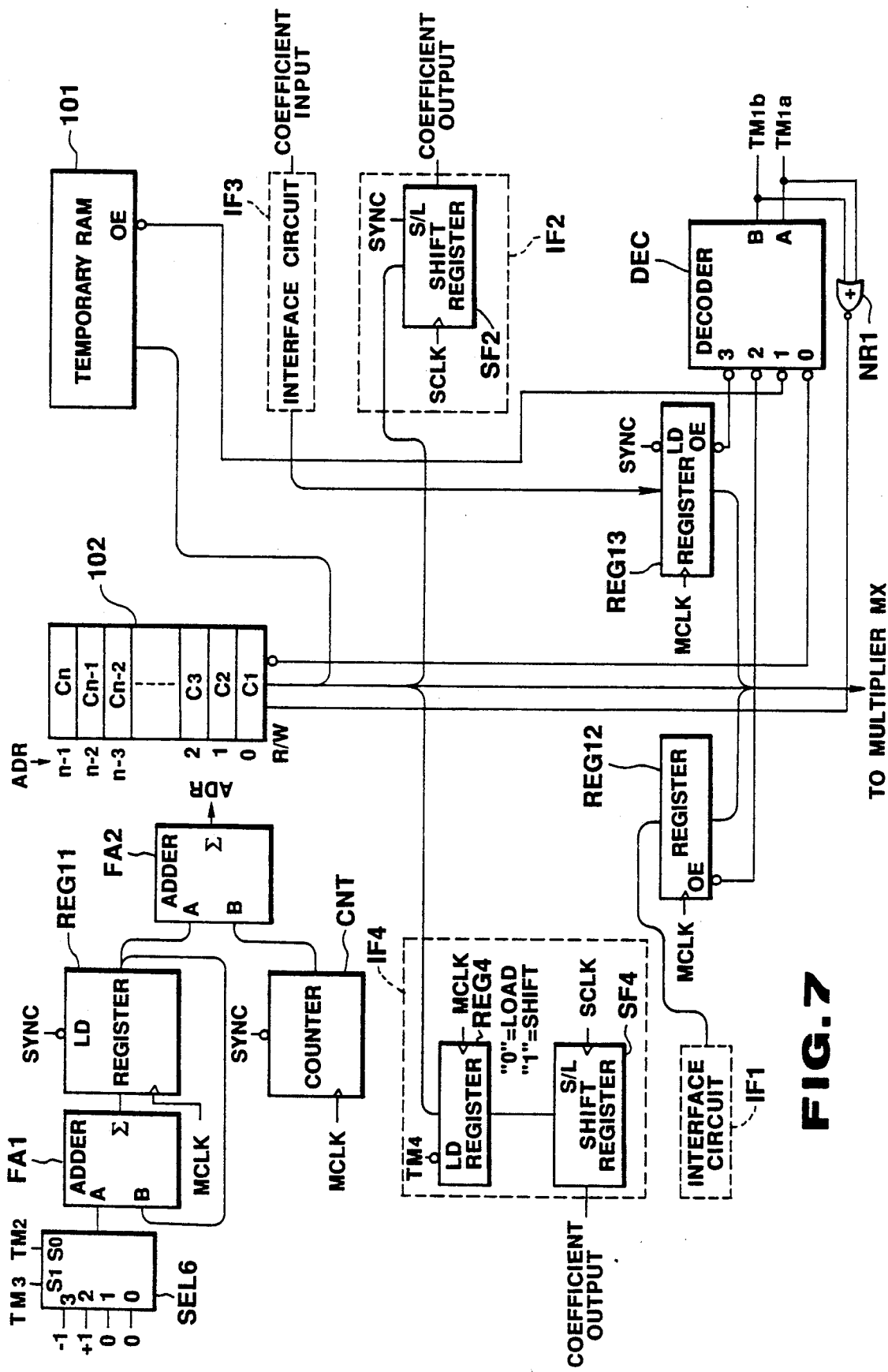
FIG. 7 is a block diagram showing the configuration of a digital signal processing circuit according to a third embodiment of the present invention.
Figure 8:
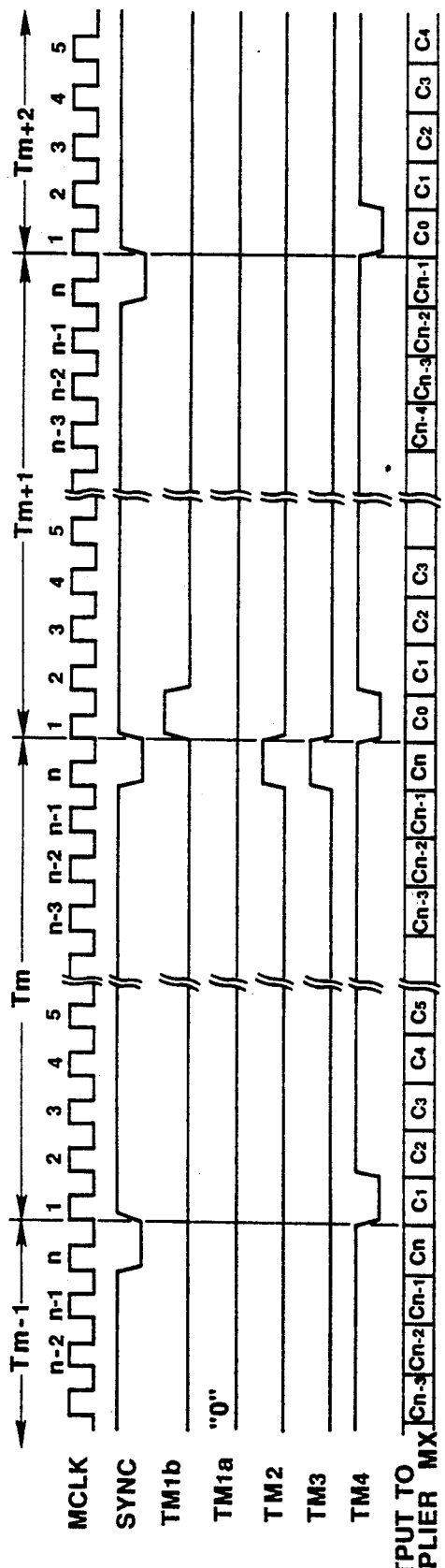
FIG. 8 and FIG. 9 are time charts showing the operation of the third embodiment of the present invention.
Figure 9:
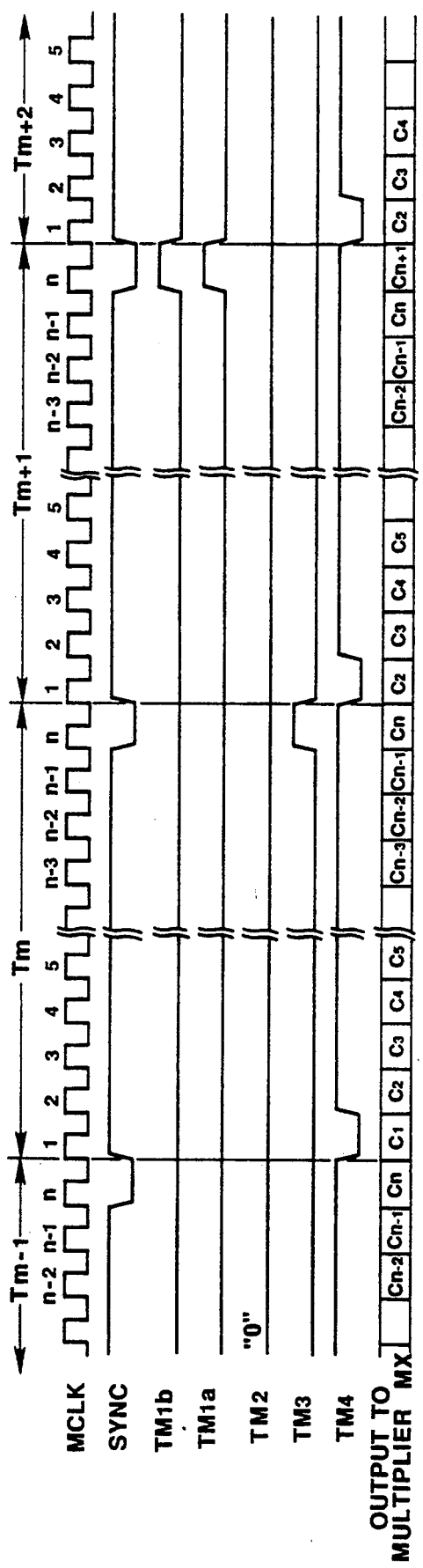

Next, description will be given with respect to the third embodiment of the present invention by referring to FIG. 7 through FIG. 9. FIG. 7 is a block diagram showing the configuration of a DSP according to a third embodiment of the present invention. In FIG. 7, parts identical to those shown in FIG. 4 will be designated by the same numerals, hence, description thereof will be omitted.

Referring to FIG. 7, 101 designates a RAM (Random access memory) which temporarily stores multiplier coefficients used for convolution computation to be inputted from an external device. 102 designates a RAM having memory storage of n words (where n is an integer), which is provided for carrying out the coefficient shifting operation identical to the operation to be carried out by the coefficient shift register CSR in foregoing first and second embodiments. Furthermore, the DSP according to the third embodiment comprises selector SEL6, adder FA1 and FA2, register REG11, REG13 and REG12, counter CNT, NOR gate NR1, and decoder DEC as the components different from those shown in FIG. 4. On the other hand, as the components identical to those shown in FIG. 4, the DSP according to the third embodiment comprises the interface circuit IF1, IF2, IF3 and IF4.

The selector SEL6 is provided with 4 input terminals indicated by [0] through [3] and 2 control terminals indicated by [$S_0$], [$S_1$], to which indicated by [0] and [1] a signal "0" are given, to which indicated by [2] a signal "+1" is given, to which indicated by [3] a signal "−1" is given, and further to which indicated by [$S_0$], [$S_1$] the control signal $TM_2$ and $TM_3$ generated by means of a coefficient input/output control portion (not shown in the drawing) are inputted as selector information, respectively. The selector SEL6 selects one of signals "0" to "−1" given to the input terminals and outputs the result of selection to the one input terminal of the adder FA1 as input A to be added. To the other input terminal of the adder FA1, the output of register REG 11 is supplied as input B to be added. The adder FA1 adds both inputs A and B together and outputs the result of summation to the register REG11 as input data. The register REG11 provides with a load terminal LD to which a predetermined synchronization signal SYNC is supplied. The synchronization signal SYNC is produced by means of coefficient input/output control portion (not shown in the drawing) and changed its level to low (i.e., level "0") within a short time to ascertain the change of a sampling period at every changing timing of sampling period. Accordingly, the output of adder FA1 is inputted into the register REG11 in synchronization with the master clock pulse MCLK every ascertained sampling period and is held therein. The data held in the register REG11 is supplied back to the adder FA1 as input B to be added described above.

The counter CNT is used for counting a number of pulses of the master clock pulse MCLK and have n stage count position, wherein the count value thereof is clear by means of the synchronization signal SYNC. A data held in the register REG11 and a count value thus calculated in the counter CNT are supplied to the adder FA2 and added together therein, the result of which is limited to between (0) to (n−1) and outputted to the RAM 102 as address information ADR. More specifically, if the result of summation is n, n+1, ..., the output ADR of adder FA2 changes to (0), (1), ..., respectively, while if the result of summation is (−1), (−2), ..., the output ADR of adder FA2 becomes to (n−1), (n−2), ..., respectively.

The register REG12 takes in a multiplier coefficient to be shifted from the former-stage DSP through the interface circuit IF1. The register REG13 takes in a multiplier coefficient to be shifted from the latter-stage DSP through the interface circuit IF3. Each of the RAMs 101, 102 and the registers REG12 and REG13 are provided with an enable terminal OE respectively, to each of which an enable signal is supplied from the decoder DEC. The decoder DEC is provided with 2 input terminals indicated by [A], [B] and 4 output terminals indicated by [0] through [3], to each of which indicated by [A] and [B] the control signals $TM_{1a}$ and $TM_{1b}$ is inputted respectively. The decoder DEC decodes the control signals $TM_{1a}$ and $TM_{1b}$ thus inputted, and outputs the decoding result to corresponding components from output terminals indicated by [0] through [3] thereof. The output terminals of RAM 101, 102 and registers REG12, 13 are connected with together in common manner, and connected with the input terminal of multiplier MX in the convolution computing portion 10 (see FIG. 1), and further connected with each of the input terminals of interface circuits IF1, IF4. The outputs of RAMs 101, 102 and registers REG12, REG13 are both controlled by means of the decoder DEC and NOR gate NR1 in such manner that one of the outputs thereof is in the enable state, and the others change to the exclusive state in response to the control signals $TM_{1b}$ and $TM_{1a}$. In other words, if the control signals $TM_{1b}$ and $TM_{1a}$ are "0,0" respectively, the output terminal indicated by [0] of decoder DEC changes to "0", and accordingly, only the RAM 102 is in the output-enable state and the others changes to the high-impedance state in output terminals thereof. In such case, the output of NOR gate NR1 is "1", based on which the RAM 102 changes to the read-out mode. Additionally, if the control signal $TM_{1b}$ and $TM_{1a}$ are "0,1" respectively, the output terminal indicated by [1] of decoder DEC changes to "0", and thus only the RAM 101 is in the output-enable state and the others becomes the high-impedance state in output terminals thereof. Similarly, if the control signals $TM_{1b}$ and $TM_{1a}$ are "1,0" respectively, and thus only the register REG12 is in the output-enable state, further if the control signals $TM_{1b}$ and $TM_{1a}$ are "1,1" respectively, and thus only the register REG13 is in the output-enable state. In such case, the output of NOR gate NR1 is "0", therefore, the RAM 102 becomes in the writing-mode, so that any one of the output data corresponding to the registers REG12, REG13 and RAM 101 is written into the RAM 102. Incidentally, other components in FIG. 7 are similar to foregoing second embodiment, except that the control signal $TM_4$ is supplied to the load terminal LD of register REG4 in the interface circuit IF4 and the synchronization signal SYNC is supplied to the shift control terminal S/L of shift register SF2 in the interface circuit IF2.

In the following section, the operation of the above described third embodiment of the present invention will be explained referring to FIGS. 8 and 9.

Normal Operation of Convolution Computing

In each sampling period, the time corresponding to one period in which the first master clock pulse MCLK is outputted, the control signal $TM_4$ becomes "0". As a result, at this time, the multiplier coefficient outputted from the RAM 102 is inputted to the register REG4 and then transferred, in serial, to the former-stage DSP by means of the shift register SF4. In addition, in each sampling period, the time corresponding to one period in which the n-th master clock pulse MCLK is outputted, the synchronization signal SYNC becomes "0". As a result, at this time, the multiplier coefficient inputted to the interface circuit IF3 form the latter-stage DSP is written into the register REG13 (see FIG. 8 and FIG. 9). These operation described above are not only carried out in the case of normal convolution computing mode, but also in the case of other operation mode in which a coefficient string in the RAM 102 described later is changed.

In the case of normal convolution computing, both of the control signals $TM_{1a}$ and $TM_{1b}$ are held to "0", and the RAM 102 is changed to read-out mode. Additionally, both of the control signals (corresponding to select information) $TM_2$ and $TM_3$ are held to "0", therefore, in response to these control signals $TM_2$ and $TM_3$ the selector SEL6 selects "0" and outputs the result of selection (i.e., "0") to the adder FA1. As a result, the register REG 11 always holds a constant value (i.e., "0") at output terminal thereof. Accordingly, the count value of counter CNT is repeatedly (0) through (n−1) by every sampling period, and then this count value is supplied to the RAM 102 through the adder FA2 as the address information ADR. Therefore, the multiplier coefficients $C_1$ to $C_n$ stored at address (0) to (n−1) in the RAM 102 are sequentially read out by each sampling period and supplied to the multiplier MX.

Operation in the Case of Adding New Coefficient at the Head Position of the Coefficient String The operation of this case will be explained referring to FIG. 8. For the sake of convenience, in the initial state, data "0" is held in the register REG11 and the multiplier coefficients $C_1$ to $C_n$ are stored at address (0) to (n−1) in the RAM 102 respectively. As described above, in one period in which the n-th master clock pulse MCLK of each sampling period is outputted, the output data of RAM 102 at this time is inputted to the interface circuit IF2 and then transferred to the interface circuit IF1 in the latter-stage DSP. In this case, the address information ADR corresponding to this timing is (n−1), so that the multiplier coefficient $C_n$ is transferred to the latter-stage DSP.

When the control signals $TM_2$ and $TM_3$ change to "1" over one period in which the n-th master clock pulse MCLK is outputted in the sampling period $T_m$, data "−1" is selected by selector SEL6 and inputted to the adder FA1, so that the output of adder FA1 changes to "−1". Next, the sampling period is changed to $T_{m+1}$, the output data "−1" of adder FA1 is inputted to the register REG11 in synchronization with the master clock pulse MCLK. In addition, both of the control signals $TM_2$ and $TM_3$ return to "0", and the input A to be added changes to "0". Thereafter, the register REG11 holds the data "−1". Additionally, in the sampling period $T_{m+1}$, when the first master clock pulse MCLK rises up, the control signal $TM_1$ changes to "1". For this reason, the register REG12 is in the enable state, and the RAM 102 is in the writing mode. As a result, the multiplier coefficient $C_O$, which had been inputted into the register REG12 from the former-stage DSP via the interface circuit IF1 at this timing, is supplied to the multiplier MX, and is written to the RAM 102. In addition, at this timing, as the count value of the counter CNT is "0", the multiplier coefficient $C_0$ is written into the address (n−1) which corresponds to the head position of the coefficient string in the RAM 102. In other words, the new multiplier coefficient $C_O$ can be added at the head position (i.e., address (n−1)) of the coefficient string. After the sampling period $T_{m+2}$, the address information ADR is sequentially changed to (n−1), (0), ..., (n−2), and the coefficient string $C_O, C_1, ..., C_{n-1}$ is sequentially supplied to the multiplier MX for the convolution computation.

Operation in the Case of Adding New Coefficient at the Last Position of the Coefficient String The operation of this case will be explained referring to FIG. 9. For convenience' sake, in the initial state, data "0" is held in the register REG11 and the multiplier coefficients $C_1$ to $C_n$ are stored at address (0) to (n−1) in the RAM 102 respectively. As described above, in one period in which the n-th master clock pulse MCLK of the sampling period $T_m$ is outputted, the output data of RAM 102 at this time is inputted to the interface circuit IF4 and then transferred to the former-stage DSP. In this case, the address information ADR corresponding to this timing is (0), so that the multiplier coefficient $C_1$ is transferred to the former-stage DSP.

When the control signal $TM_3$ holds to "1" over one period in which the n-th master clock pulse MCLK is outputted in the sampling period $T_m$, data "+1" is selected by selector SEL6 and then inputted to the adder FA1, so that the output of adder FA1 changes to "−1". Next, the sampling period is changed to $T_{n+1}$, the output data "+1" of adder FA1 is inputted to the register REG11 in synchronization with the master clock pulse MCLK. In additiom, the control signal $TM_3$ return to "0", and the input A to be added becomes to "0". Thereafter, the register REG11 holds the data "+1". Accordingly, in the sampling period $T_{m+1}$, the time in which the first master clock pulse MCLK to the (n−1)-th master clock pulse MCLK are outputted, the address information ADR is sequentially changed to (1), (2), ..., (n−1). Therefore, in response to the sequentially changed address information ADR, the multiplier coefficients $C_2$ to $C_n$ are sequentially read out from the RAM 102 and supplied to the multiplier MX. When the n-th master clock pulse MCLK rises up, both of the control signals $TM_{1a}$ and $TM_{1b}$ becomes "1". For this reason, the register REG13 is set in the enable state, and the RAM 102 is set in the writing mode. As a result, the multiplier coefficient $C_{n+1}$, which has been inputted to the register REG13 from latter-stage DSP via the interface circuit IF3 at this timing, is supplied to the multiplier MX, and to the RAM 102 where the multiplier coefficient $C_{n+1}$ thus supplied is written therein. In addition, at this timing, as the address information ADR is (0), in response to this address information ADR the multiplier coefficient $C_{n+1}$ is written into the address 0 which corresponds to the last position of the coefficient string in the RAM 102. In other words, the new multiplier coefficient $C_{n+1}$ can be added at the last position (i.e., address 0) of the coefficient string. After the sampling period $T_{m+2}$, the address information ADR is sequentially changed to (1), (2), ..., (n−1), (0), and the coefficient string $C_2$, ..., $C_n$, $C_{n+1}$ is sequentially supplied to the multiplier MX.

Operation in the Case of Replacing Current Coefficient by New Coefficient at an Arbitrary Position of the Coefficient String In this case, at the timing corresponding to the arbitrary position at which a current coefficient is replaced by a new one, the control signal $TM_{1b}$ is changed to "0", the control signal $TM_{1a}$ is changed to "1". As a result, the RAM 101 changes to the enable state, so that the read out data (corresponding to the new coefficient) from the RAM 101 is written into the storing address (corresponding to the arbitrary position of the coefficient string) which is designated by the address information ADR at this timing as new coefficient. In other words, the current coefficient to be replaced at arbitrary position of the coefficient string can be replaced by the read out data corresponding to the new multiplier coefficient.

EXAMPLES OF APPLICATION OF THE PRESENT INVENTION

It is easy for the DSP to input a multiplier coefficient to the coefficient shift register CSR, so that in addition to the convolution computation, the numerous applications applied to various signal processings are possible, but not limited to, the following:

As the first application, the DSP according to the present invention is applied to a simulation system, for example, an impulse response simulation system. This simulation system includes the DSP configured according to the present invention, and further comprises an analog-to-digital converting circuit. In this case, an impulse signal is inputted to the circuit on which an impulse response simulation is carried out in advance, and a response waveform of the circuit to be simulated is sampled, after which the analog response waveform thus sampled is converted into a digital impulse response data by means of the analog-to-digital converting circuit described above, thereby obtaining a sampling data h(k) (where k=1 to n) as the impulse response previous to carrying out the simulation. Herein, in such case, h(1) is the first sampling data after the impulse signal is inputted to the circuit. Then, the sampling data h(k) (k=1 to n) thus obtained are written into the DSP as coefficient string. More specifically, the above-mentioned sampling data h(k) are written into the DSP in the form of string which corresponds to the reverse direction of passing the time, in such manner that each of the sampling data h(1) to h(n) correspond to each of the multiplier coefficients $C_1$ to $C_n$, respectively. The above described simulation system corresponds to the case where a multiplier coefficient is added to the head position of the coefficient string. By executing the above-mentioned processing by use of the DSP according to the present invention, the convolution computation is carried out by use of the sampling data h(1) to h(n) which are obtained by the impulse response manner. Therefore, by using the sampling data h(1) to h(n) as multiplier coefficients, the signal processing similar to the original circuit from which the impulse response waveform is sampled, can be performed.

As the second application, the DSP according to the present invention is applied to calculate an autocorrelation coefficient to be used for a specific device, for example, another DSP. In this case the signal string $X_1$, $X_2$, ... to be carried out the autocorrelation calculation are transferred to the DSP as multiplier coefficients $C_1$, $C_2$, ... used for the convolution computation, after which the same signal string $X_1$, $X_2$, ... described above are also supplied to the DSP as the series of input digital data to be carried out the convolution computation. By executing such processing, the convolution computation is carried out on them, that is, on the identical signal string with together, as a result, the autocorrelation coefficient can be obtained and outputted.

In the present specification, preferred embodiments of the digital signal processing circuit of the present invention has been described. The described embodiments are meant to be illustrative, however, and are not intended to represent limitations. Accordingly, numerous variations and enhancements thereto are possible without departing from the spirit or essential character of the present invention as described. The present invention should therefore be understood to include any apparatus and variations thereof encompassed by the scope of the appended claims.

What is claimed is:

1. A digital signal processing circuit for carrying out a convolution computation on a series of input data by use of a multiplier coefficient, comprising:
    (a) storing means for storing said multiplier coefficient, in which a value of each of a plurality of multiplier coefficients can be arbitrarily changed;
    (b) input/output control means for controlling a selection of a data input/output manner so that said multiplier coefficient is inputted to or outputted from said storing means by either a data first-in-first-out manner or a data circulation manner;
    (c) computing means for carrying out said convolution computation on said series of input data by use of said multiplier coefficient to be sequentially outputted from said storing means when said data circulation manner is selected;
    (d) output means for receiving the convolution computation from the computing means; and
    (e) coefficient transfer means coupled between the storing means and an external device for carrying out a transfer process on said multiplier coefficient, said coefficient transfer means being activated so that said multiplier coefficient is transferred between said storing means and the external device when said data first-in-first-out manner is selected.

2. A digital signal processing circuit according to claim 1, wherein said multiplier coefficient to be firstly inputted to said storing means is firstly outputted from said storing means in said data first-in-first-out manner, while said multiplier coefficients are repeatedly circulating through said storing means and a desirable one of them is picked up from said storing means during circulation of said multiplier coefficients in said data circulation manner.

3. A digital signal processing circuit according to claim 1, wherein said input data is inputted to said computing means sequentially during a predetermined sampling period.

4. A digital signal processing circuit according to claim 1, wherein said digital processing circuit comprises a plurality of units which comprise said storing means, input/output control means, computing means and coefficient transfer means, the plurality of units being connected together in a cascade manner.

5. A digital signal processing circuit for carrying out a convolution computation on a series of input data by use of a multiplier coefficient, comprising:
   (a) a shift register having a plurality of memory cells respectively storing said multiplier coefficient, said multiplier coefficient being sequentially shifted through said shift register in a data circulation manner;
   (b) selecting means for selecting plural memory cells from among the plurality of memory cells in said shift register, so that said multiplier coefficient is shifted through the selected plural memory cells in the data circulation manner;
   (c) computing means for carrying out a convolution computation on said series of input data by use of said multiplier coefficient to be sequentially picked up from a predetermined memory cell within the selected plural memory cells in the shift register;
   (d) output means for receiving the convolution computation from the computing means;
   (e) writing means for writing a multiplier coefficient supplied from an external device into a predetermined memory cell in the shift register; and
   (f) outputting means for outputting said multiplier coefficient stored in a predetermined memory cell in the shift register to said external device.

6. A digital signal processing circuit according to claim 5, wherein each of the predetermined memory cells comprises the same memory cell.

7. A digital signal processing circuit according to claim 5, wherein two of the predetermined memory cells comprise the same memory cell.

8. A digital signal processing circuit for carrying out a convolution computation on a series of input data by use of multiplier coefficients, comprising:
   (a) a random access memory for storing a plurality of said multiplier coefficients;
   (b) input/output control means for controlling read/write addresses of said random access memory to thereby control a selection of a data input/output manner so that said plurality of multiplier coefficients are inputted to or outputted from said random access memory by either a data first-in-first-out manner or a data circulation manner;
   (c) computing means for carrying out a convolution computation on said series of input data by use of said plurality of multiplier coefficients to be sequentially circularly read from said random access memory;
   (d) output means for receiving the convolution computation from the computing means; and
   (e) coefficient transfer means for carrying out a transfer process on said plurality of multiplier coefficients, said coefficient transfer means being activated so that said plurality of multiplier coefficients are transferred between said random access memory and an external device when said data first-in-first-out manner is selected.

9. A digital signal processing circuit according to claim 8, wherein that one of said plurality of multiplier coefficients to be firstly inputted to said random access memory is firstly outputted from said random access memory in said data first-in-first-out manner, while said plurality of multiplier coefficients are repeatedly circulating through said random access memory and a desirable one of them is picked up from said random access memory during circulation of said plurality of multiplier coefficients in said data circulation manner.

* * * * *